United States Patent [19]
Takeda

[11] Patent Number: 5,980,773
[45] Date of Patent: Nov. 9, 1999

[54] MANGANESE-ZINC SYSTEM FERRITE

[75] Inventor: Osamu Takeda, Tokyo, Japan

[73] Assignee: TDK Corporation, Tokyo, Japan

[21] Appl. No.: 09/301,573

[22] Filed: Apr. 29, 1999

Related U.S. Application Data

[63] Continuation of application No. PCT/JP98/03763, Aug. 25, 1998.

[51] Int. Cl.$^6$ ..................................................... H01F 1/34
[52] U.S. Cl. ................................ 252/62.62; 252/62.59; 252/62.63
[58] Field of Search .............................. 252/62.62, 62.59, 252/62.63

[56] References Cited

U.S. PATENT DOCUMENTS

| | | | |
|---|---|---|---|
| 5,498,361 | 3/1996 | Matsukawa et al. | 252/62.62 |
| 5,518,642 | 5/1996 | Inoue et al. | 252/62.62 |
| 5,779,930 | 7/1998 | Inoue | 252/62.59 |
| 5,846,448 | 12/1998 | Yasuhara et al. | 252/62.62 |

FOREIGN PATENT DOCUMENTS

| | | |
|---|---|---|
| 3-141612 | 6/1991 | Japan . |
| 6-120022 | 4/1994 | Japan . |
| 7-297020 | 11/1995 | Japan . |

*Primary Examiner*—C. Melissa Koslow
*Attorney, Agent, or Firm*—Oblon, Spivak, McClelland, Maier & Neustadt, P.C.

[57] ABSTRACT

The manganese-zinc system ferrite of the invention has an initial permeability $\mu i$ at a frequency of 100 kHz and at 25° C. of 5,000 or more, and a core loss Pcv at a frequency of 100 kHz and at 200 mT and 40° C. of 400 kW/m$^3$ or less.

11 Claims, 1 Drawing Sheet

MANGANESE-ZINC SYSTEM FERRITE

This application is a continuation of International appln. No. PCT/JP98/03763 filed on Aug. 25, 1998.

TECHNICAL FIELD

The present invention relates to a manganese-zinc system ferrite excellent in direct current overlapping characteristics, and more particularly, it relates to a manganese-zinc system ferrite used in a coil component and a transformer of various communication equipments and consumer equipments in that direct current overlapping characteristics are considered.

BACKGROUND ART

A manganese-zinc system ferrite is used as a material of a core of a coil component and a transformer of various communication equipments and consumer equipments. In these applications, particularly in a ferrite core for a communication equipment, high permeability characteristics are required at a relatively high frequency in a broad range (about from 100 to 500 kHz). A manganese-zinc system ferrite having a high initial permeability $\mu i$ in such a frequency range is described in JP-A-6-204025 (added with Bi and Mo, initial permeabilities $\mu i$ at 100 kHz and 500 kHz of 9,000 or more and 3,000 or more, respectively). In conventional manganese-zinc system ferrite in this application, there has been no need to consider a saturation magnetic flux density Bs and direct current overlapping characteristics.

However, with the spread of a portable communication equipment, such as a portable computer terminal, and an ISDN in recent years, further miniaturization of such equipments is demanded, and in a manganese-zinc system ferrite for these communication equipments, demands for a high saturation magnetic flux density, high direct current overlapping characteristics and a low core loss are being increased.

DISCLOSURE OF THE INVENTION

Accordingly, an object of the invention is to provide a manganese-zinc system ferrite having an initial permeability $\mu i$ of 5,000 or more and a core loss Pcv of 400 kW/m$^3$ or less.

Another object of the invention is to provide a manganese-zinc system ferrite having a saturation magnetic flux density Bs of 500 mT or more and being excellent in direct current overlapping characteristics.

These objects are accomplished by any one of the following constitutions (1) to (11).

(1) A manganese-zinc system ferrite, which is a manganese-zinc system ferrite having an initial permeability $\mu i$ at a frequency of 100 kHz and at 25° C. of 5,000 or more, and a core loss Pcv at a frequency of 100 kHz and at 200 mT and 40° C. of 400 kW/m$^3$ or less.

(2) A manganese-zinc system ferrite of (1), which has a saturation magnetic flux density Bs at a frequency of 100 kHz and at 25° C. of 500 mT or more.

(3) A manganese-zinc system ferrite of (1), wherein a main component raw material comprises an iron oxide raw material in an amount of from 53.6 to 54.4 mol % calculated as Fe$_2$O$_3$ and a zinc oxide raw material of from 13.0 to 13.5 mol % calculated as ZnO, with the balance being a manganese oxide raw material.

(4) A manganese-zinc system ferrite of (3), wherein the amount of the iron oxide raw material is from 53.7 to 54.2 mol % calculated as Fe$_2$O$_3$.

(5) A manganese-zinc system ferrite of (1), wherein a subsidiary component raw material comprises a silicon oxide raw material in an amount of from 110 to 170 ppm calculated as SiO$_2$, a calcium oxide raw material in an amount of from 100 to 250 ppm calculated as CaO, a tin oxide raw material in an amount of from 500 to 4,000 ppm calculated as SnO$_2$, a niobium oxide raw material in an amount of from 50 to 350 ppm calculated as Nb$_2$O$_5$, a zirconium oxide raw material in an amount of from 100 to 400 ppm calculated as ZrO$_2$, a bismuth oxide raw material in an amount of from 50 to 200 ppm calculated as Bi$_2$O$_3$, and a molybdenum oxide raw material in an amount of from 50 to 200 ppm calculated as MoO$_3$.

(6) A manganese-zinc system ferrite of (5), wherein a subsidiary component raw material comprises a silicon oxide raw material in an amount of from 115 to 150 ppm calculated as SiO$_2$, a calcium oxide raw material in an amount of from 130 to 230 ppm calculated as CaO, a tin oxide raw material in an amount of from 1,000 to 3,000 ppm calculated as SnO$_2$, a niobium oxide raw material in an amount of from 100 to 300 ppm calculated as Nb$_2$O$_5$, a zirconium oxide raw material in an amount of from 100 to 300 ppm calculated as ZrO$_2$, a bismuth oxide raw material in an amount of from 100 to 200 ppm calculated as Bi$_2$O$_3$, and a molybdenum oxide raw material in an amount of from 50 to 150 ppm calculated as MoO$_3$.

(7) A manganese-zinc system ferrite, which is a manganese-zinc system ferrite having an initial permeability $\mu i$ at a frequency of 100 kHz and at 25° C., a core loss Pcv at a frequency of 100 kHz and at 200 mT and 40° C., and a saturation magnetic flux density Bs at 25° C. that satisfy:

$$7{,}000 \leq \mu i \cdot Bs/Pcv$$

(8) A manganese-zinc system ferrite of (7), wherein a main component raw material comprises an iron oxide raw material in an amount of from 53.6 to 54.4 mol % calculated as Fe$_2$O$_3$ and a zinc oxide raw material of from 13.0 to 13.5 mol % calculated as ZnO, with the balance being a manganese oxide raw material.

(9) A manganese-zinc system ferrite of (7), wherein the amount of the iron oxide raw material is from 53.7 to 54.2 mol % calculated as Fe$_2$O$_3$.

(10) A manganese-zinc system ferrite of (7), wherein a subsidiary component raw material comprises a silicon oxide raw material in an amount of from 110 to 170 ppm calculated as SiO$_2$, a calcium oxide raw material in an amount of from 100 to 250 ppm calculated as CaO, a tin oxide raw material in an amount of from 500 to 4,000 ppm calculated as SnO$_2$, a niobium oxide raw material in an amount of from 50 to 350 ppm calculated as Nb$_2$O$_5$, a zirconium oxide raw material in an amount of from 100 to 400 ppm calculated as ZrO$_2$, a bismuth oxide raw material in an amount of from 50 to 200 ppm calculated as Bi$_2$O$_3$, and a molybdenum oxide raw material in an amount of from 50 to 200 ppm calculated as MoO$_3$.

(11) A manganese-zinc system ferrite of (7), wherein a subsidiary component raw material comprises a silicon oxide raw material in an amount of from 115 to 150 ppm calculated as SiO$_2$, a calcium oxide raw material in an amount of from 130 to 230 ppm calculated as CaO, a tin oxide raw material in an amount of from 1,000 to 3,000 ppm calculated as SnO$_2$, a niobium oxide raw material in an amount of from 100 to 300 ppm calculated as Nb$_2$O$_5$, a zirconium oxide raw material in an amount of from 100 to 300 ppm calculated as ZrO$_2$, a bismuth oxide raw material in an amount of from 100 to 200 ppm calculated as Bi$_2$O$_3$, and a molybdenum oxide raw material in an amount of from 50 to 150 ppm calculated as $MoO_3$.

FUNCTION AND EFFECT

In the manganese-zinc system ferrite of the invention, by defining the amounts of the main components as the ranges described above, the saturation magnetic flux density Bs can be increased with maintaining the initial permeability $\mu i$, and further the direct current overlapping characteristics can be increased. Thus, particularly because the saturation magnetic flux density Bs can be made 500 mT or more, when it is used as a core for a transformer that is required to have direct current overlapping characteristics for a communication equipment, etc., it is possible to realize reduction of the turn number of the coil of the transformer or miniaturization of the core or the transformer. Furthermore, because it contains silicon oxide, calcium oxide, tin oxide, niobium oxide, zirconium oxide, bismuth oxide and molybdenum oxide as subsidiary components in the prescribed amounts, the initial permeability $\mu i$ is high, the core loss Pcv is low, and the saturation magnetic flux density Bs is high especially at a frequency of from 100 to 500 kHz.

Improvements in core loss Pcv in a high frequency region of from 100 to 500 kHz are demanded in a manganese-zinc system ferrite for a power transformer, and various proposals have been made. For example, JP-A-60-132302 discloses a manganese-zinc system ferrite, which is improved in core loss and magnetic characteristics under the measuring conditions of 100 kHz and 200 mT by adding $SnO_2$, $ZrO_2$ and $Nb2O_5$. In practical, a ferrite core having a core loss Pcv of 400 kW/m³ or less has been available. However, while there is a manganese-zinc system ferrite for a power transformer having a saturation magnetic flux density Bs of 500 mT or more, in which the direct current overlapping characteristics have been considered, its initial permeability $\mu i$ is at most 2,300 or less.

While there has been one having a core loss Pcv of 400 kW/m³ or less as another manganese-zinc system ferrite for a transformer, it has a saturation magnetic flux density Bs of at most about 470 mT, and it is not satisfactory although direct current overlapping characteristics have been considered.

Also, according to the studies made by the present inventors, it has been found that when the above-described value of $\mu i \cdot Bs(25°\ C.)/Pcv(40°\ C.)$ becomes 7,000 or more, the direct current overlapping characteristics are improved. The manganese-zinc system ferrite of the invention satisfies it.

BEST MODE FOR CARRYING OUT THE INVENTION

Figure 1:
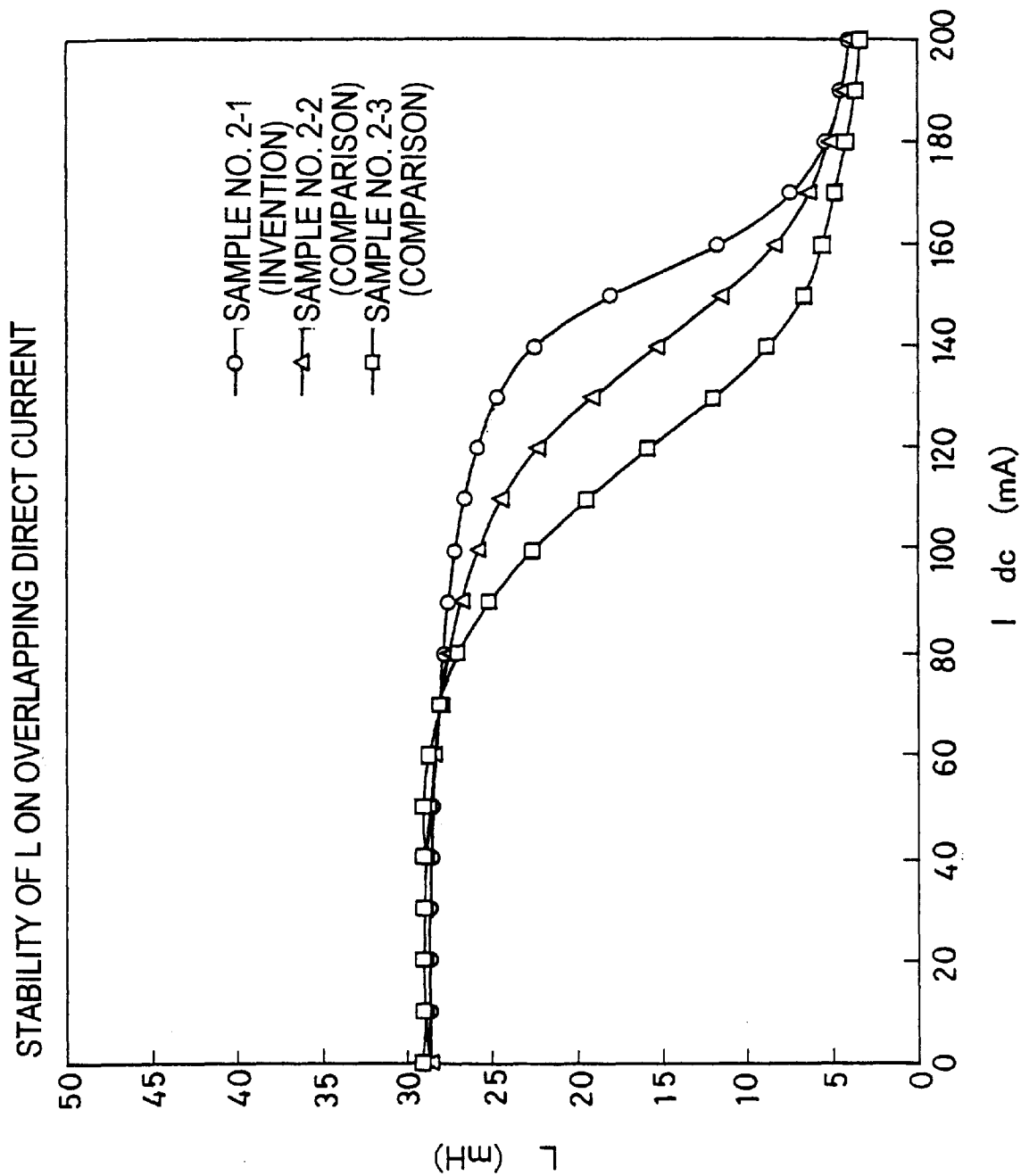
FIG. 1 is a graph showing the direct current overlapping characteristics of the samples of core according to the Example of the invention and the Comparative Examples.

The specific constitution of the invention is described in detail below.

The manganese-zinc system ferrite of the invention has, as magnetic characteristics, all an initial permeability $\mu i$ at a frequency of 100 kHz and at 25° C. of 5,000 or more, a saturation magnetic flux density Bs at a frequency (25° C.) of 500 mT or more, and a core loss Pcv at 40° C. on application of a magnetic field of a sine wave alternating current of a frequency of 100 kHz and 200 mT of 400 kW/m³ or less. The initial permeability $\mu i$ is preferably as large as possible, but the upper limit thereof at present is about 6,000. The saturation magnetic flux density Bs is preferably as large as possible, but the upper limit thereof at present is about 540 mT. The core loss Pcv is preferably as small as possible, but the lower limit thereof at present is about 270 kW/m³.

Also, in the manganese-zinc system ferrite of the invention, the value of $\mu i \cdot Bs/Pcv$ is 7,000 or more, preferably 7,200 or more, and particularly preferably 8,000 or more. Its upper limit is about 9,500. When the value is 7,000 or more, it is not necessarily $\mu i \geq 5,000$, $Bs(25°\ C.) \geq 500$ mT, and $Pcv \leq 400$ kW/m³, as described above. Accordingly, the manganese-zinc system ferrite of the invention is improved in direct current overlapping characteristics.

Furthermore, in the manganese-zinc system ferrite of the invention, the ratio of the residual magnetic flux density to the saturation magnetic flux density, i.e., the squareness ratio Br/Bs, is preferably from 0.1 to 0.3, and particularly preferably from 0.1 to 0.2.

As the main component raw material of the manganese-zinc system ferrite of the invention, an iron oxide raw material in an amount of from 53.6 to 54.4 mol %, and particularly preferably from 53.7 to 54.2 mol %, calculated as $Fe_2O_3$; a zinc oxide raw material of from 13.0 to 13.5 mol %, and particularly preferably from 13.1 to 13.4 mol %, calculated as ZnO; and a manganese oxide raw material (the balance of the main component raw material) are preferably used. When the composition of the main component raw material is outside the range described above, there is mainly a tendency in that a high saturation magnetic flux density Bs cannot be obtained.

As the main component raw material, an iron oxide raw material, a manganese oxide raw material, and a zinc oxide raw material that are generally used, i.e., oxides or various compounds becoming oxides on calcination, may be used.

The subsidiary component raw material contains a silicon oxide raw material, a calcium oxide raw material, a tin oxide raw material, a niobium oxide raw material, a zirconium oxide raw material, a bismuth oxide raw material and a molybdenum oxide raw material. As the respective raw materials, an oxide of each of the metals or a compound becoming an oxide on calcination may be used. $SiO_2$ is preferred as the silicon oxide raw material; $CaCO_3$ is preferred as the calcium oxide raw material; $SnO_2$ is preferred as the tin oxide raw material; $Nb_2O_5$ is preferred as the niobium oxide raw material; $ZrO_2$ is preferred as the zirconium oxide raw material; $Bi_2O_3$ is preferred as the bismuth oxide raw material; and $MoO_3$ is preferred as the molybdenum oxide raw material.

The content of the silicon oxide raw material is preferably from 110 to 170 ppm, and particularly preferably from 115 to 150 ppm, calculated as $SiO_2$. When the content is outside the above-described range, there is a tendency in that the initial permeability $\mu i$ becomes low and the core loss Pcv becomes large.

The content of the calcium oxide raw material is preferably from 100 to 250 ppm, and particularly preferably from 130 to 230 ppm, calculated as CaO. When the content is outside the above-described range, there is a tendency in that the initial permeability $\mu i$ becomes low and the core loss Pcv becomes large.

The content of the tin oxide raw material is preferably from 500 to 4,000 ppm, and particularly preferably from 1,000 to 3,000 ppm, calculated as $SnO_2$. When the content is outside the range, there is a tendency in that the initial permeability $\mu i$ becomes low and the core loss Pcv becomes large, as similar to the components described above.

The content of the niobium oxide raw material is preferably from 50 to 350 ppm, and particularly preferably from 100 to 300 ppm, calculated as $Nb_2O_5$. When the content is too small, there is a tendency in that the core loss Pcv becomes large, whereas when the content is too large, the initial permeability $\mu i$ becomes low and the core loss Pcv becomes large.

The content of the zirconium oxide raw material is preferably from 100 to 400 ppm, and particularly preferably from 100 to 300 ppm, calculated as $ZrO_2$. When the content is outside the above-described range, there is a tendency in that the core loss Pcv becomes large.

The content of the bismuth oxide raw material is preferably from 50 to 200 ppm, and particularly preferably from 100 to 200 ppm, calculated as $Bi_2O_3$. When the content is outside the above-described range, there is a tendency in that the initial permeability $\mu i$ becomes small.

The content of the molybdenum oxide raw material is preferably from 50 to 200 ppm, and particularly preferably from 50 to 150 ppm, calculated as $MoO_3$. When the content is outside the range, the initial permeability $\mu i$ becomes small. When the content is too small, abnormal grain growth occurs on calcination to make the initial permeability $\mu i$ low. On the other hand, when the content is too large, because the amount of Mo that is sublimated or evaporated on calcination becomes large, the scatter in magnetic characteristics becomes large when a large number of molded articles are simultaneously calcined.

The contents of the subsidiary component raw material are ratios relative to the main component raw material.

In the manganese-zinc system ferrite of the invention, substances other than the subsidiary components described above are preferably not contained as possible, but one or more of $Ta_2O_5$, $V_2O_5$, $In_2O_3$, $TiO_2$, etc., for example, may be contained. The contents thereof are preferably from about 0 to 300 ppm calculated as $TiO_2$, and from about 0 to 100 ppm in total calculated as $Ta_2O_5$, $V_2O_5$ and $In_2O_3$.

To the mixture of the main component raw material and the subsidiary component raw material is added a suitable binder such as polyvinyl alcohol, etc. in an appropriate amount, e.g., from 0.1 to 1.0% by weight and granulated into a grain size of from about 80 to 200 $\mu m$ by using a spray dryer or the like, followed by molding.

Next, the molded article is calcined. On calcination, for example, it is gradually heated to a calcination temperature at a temperature increasing rate of from about 50 to 300° C./hr under an atmosphere of controlled oxygen concentration, and is generally maintained at a prescribed temperature of 1,250° C. or higher, and particularly of the range of from 1,300 to 1,400° C., for from about 4 to 5 hours, to complete the calcination. After completion of the calcination, it is preferred that it is cooled at a temperature decreasing rate of from about 50 to 300° C./hr in an atmosphere of controlled oxygen concentration.

When the calcination is carried out, the oxygen partial pressure is preferably 25% or more, particularly 30% or more, and more particularly from 30 to 100%, at least in a period of from 1,000° C. on increasing the temperature to the temperature maintaining step, and more preferably in a temperature range of 1,000° C. or more. Generally, in the case where crystalline grains having a relatively large grain size are obtained to increase the permeability, a high calcination temperature with a long maintaining time may be applied. However, when calcination is conducted at a high temperature with a long period of time, the life of a calcination furnace may be shortened or the productivity may be deteriorated. However, in the composition system using bismuth oxide, molybdenum oxide and niobium oxide in combination, the initial permeability $\mu i$ at from 100 to 500 kHz can be increased with a relatively low calcination temperature with a short period of time by conducting the oxygen calcination described above. Furthermore, sublimation or evaporation of Mo and Bi is suppressed in the calcination at low temperature with a short period of time, and thus the scatter in the initial permeability $\mu i$ can be made small.

In general, the calcination is preferably conducted in a pressure furnace. In the pressure furnace, a setter carrying plural molded articles is continuously loaded into the furnace to realize continuous calcination.

When the raw materials described above are used, the composition after calcination generally becomes as follows. The main component comprises iron oxide in an amount of from 53.6 to 54.4 mol %, and preferably from 53.7 to 54.2 mol %, calculated as $Fe_2O_3$, and zinc oxide in an amount of from 13.0 to 13.5 mol % calculated as ZnO, with the balance being a manganese oxide component.

The subsidiary component comprises silicon oxide in an amount of from 110 to 170 ppm, and preferably from 115 to 150 ppm, calculated as $SiO_2$ and calcium oxide in an amount of from 100 to 250 ppm, and preferably from 130 to 250 ppm, calculated as CaO; tin oxide in an amount of from 500 to 4,000 ppm, and preferably from 1,000 to 3,000 ppm, calculated as $SnO_2$; niobium oxide in an amount of from 50 to 350 ppm, and preferably from 100 to 300 ppm, calculated as $Nb_2O_5$; zirconium oxide in an amount of from 100 to 400 ppm, and preferably from 100 to 300 ppm, calculated as $ZrO_2$; bismuth oxide in an amount of from 50 to 200 ppm, and preferably from 100 to 200 ppm, calculated as $Bi_2O_3$; and molybdenum oxide in an amount of from 50 to 200 ppm, preferably from 50 to 150 ppm, calculated as $MoO_3$. There is a case where the amount of the subsidiary component in the core is larger than the addition amount of the subsidiary component raw material. This is because the elements constituting the subsidiary component are often contained as impurities in the main component raw material. There is a case where the amount of the subsidiary component in the manganese-zinc system ferrite is smaller than the addition amount of the subsidiary component raw material. This is because the elements constituting the subsidiary component may be sublimated or evaporated on calcination.

The average crystalline grain size of the manganese-zinc system ferrite of the invention is preferably from 5 to 50 $\mu m$. When the average crystalline grain size is too large or too small, the high frequency characteristics of the initial permeability $\mu i$ are lowered. The average crystalline grain size can be obtained as, after subjecting a mirror polished surface to acid etching, an average value of diameters when the polycrystals observed by an optical microscope are converted to circles.

The manganese-zinc system ferrite of the invention produced in the manner described above attains all an initial permeability $\mu i$ at a frequency of 100 kHz of 5,000 or more, a saturation magnetic flux density Bs of 500 mT or more, and a core loss Pcv at 40° C. on application of a magnetic field of a sine wave alternating current of a frequency of 100 kHz and 200 mT of 400 kW/m³ or less. Furthermore, a value of $\mu i \cdot Bs(25°\ C.)/Pcv(40°\ C.)$ of 7,000 or more can also be attained.

Upon production of a core by using the manganese-zinc system ferrite of the invention, its shape may be in a pot form, a troidal shape, an EI, etc. In a core of a pot form, a troidal shape, an EI, etc., an air gap of 50 $\mu$m or less may be provided to adjust the impedance.

EXAMPLES

Specific Examples of the invention are shown below to describe the invention in more detail.

Example 1

A mixture of MnO, ZnO and $Fe_2O_3$ as main component raw materials, and $SiO_2$, $SnO_2$, $Nb_2O_5$, $ZrO_2$, $Bi_2O_3$, $MoO_3$ and $CaCO_3$ as subsidiary component raw materials was prepared at the composition ratio shown in Table 1.

A binder was added to the mixture and granulated into an average grain size of 150 $\mu$m by a spray dryer, followed by molding. The molded article was increased in temperature in an atmosphere, in which the oxygen partial pressure was controlled, and calcined while maintaining at 1,350° C. for 4 hours. Thereafter, it was cooled in an atmosphere, in which the oxygen partial pressure was controlled, to obtain a core sample in a troidal form with an outer diameter of 31 mm, an inner diameter of 19 mm and a height of 8 mm. A pressure furnace was used for calcination. 343 molded articles were carried per one setter. The carrying pattern was 7×7 per one stage, and the number of stages was 7.

When the samples were measured with a fluorescent X-ray analyzer, they were substantially equivalent to the compositions of the raw materials.

TABLE 2

| | | Bs (mT) | | Pcv | |
|---|---|---|---|---|---|
| Sample No. | $\mu i$ | 25° C. | 100° C. | (kW/m³) 40° C. | $\mu i \times Bs\ (25°\ C.)$ / Pcv (40° C.) |
| 1 (Invention) | 5502 | 526 | 397 | 328 | 8836 |
| 2 (Comparison) | 4920 | 505 | 370 | 495 | 5019 |
| 3 (Comparison) | 5240 | 498 | 370 | 607 | 4299 |
| 4 (Invention) | 5290 | 528 | 395 | 382 | 7286 |
| 5 (Invention) | 5610 | 533 | 402 | 378 | 7888 |
| 6 (Comparison) | 5400 | 532 | 401 | 650 | 4416 |
| 7 (Comparison) | 5610 | 529 | 380 | 520 | 5702 |
| 8 (Comparison) | 5420 | 521 | 386 | 431 | 6552 |
| 9 (Comparison) | 4850 | 528 | 396 | 442 | 5794 |
| 10 (Comparison) | 5370 | 521 | 388 | 463 | 6043 |
| 11 (Comparison) | 5010 | 526 | 392 | 449 | 5869 |
| 12 (Comparison) | 4810 | 518 | 387 | 528 | 4719 |
| 13 (Comparison) | 5670 | 522 | 401 | 542 | 5460 |
| 14 (Comparison) | 5370 | 522 | 400 | 443 | 6257 |
| 15 (Comparison) | 4870 | 521 | 397 | 564 | 4499 |
| 16 (Comparison) | 5402 | 518 | 394 | 489 | 5722 |
| 17 (Comparison) | 5110 | 522 | 391 | 467 | 5712 |
| 18 (Comparison) | 4810 | 511 | 378 | 421 | 5838 |
| 19 (Comparison) | 4720 | 512 | 376 | 549 | 4402 |
| 20 (Comparison) | 4980 | 518 | 380 | 452 | 5702 |
| 21 (Comparison) | 4980 | 520 | 388 | 497 | 5210 |
| 22 (Invention) | 5150 | 526 | 398 | 352 | 7680 |
| 23 (Invention) | 5200 | 527 | 396 | 368 | 7431 |
| 24 (Comparison) | 5380 | 470 | 338 | 370 | 6815 |

The initial permeability $\mu i$ at a frequency of 100 kHz and at 25° C. was measured for each of the samples. The results are shown in Table 2.

Furthermore, the core loss Pcv at 40° C. was measured for each of the samples on application of a magnetic field of a sine wave alternating current of a frequency of 100 kHz and 200 mT (maximum value). The results are shown in Table 2.

TABLE 1

| | Main Component (mol %) | | | Subsidiary Component (ppm) | | | | | | |
|---|---|---|---|---|---|---|---|---|---|---|
| Sample No. | $Fe_2O_3$ | MnO | ZnO | $SiO_2$ | CaO | $SnO_2$ | $Nb_2O_5$ | $ZrO_2$ | $Bi_2O_3$ | $MoO_3$ |
| 1 (Invention) | 53.9 | 32.8 | 13.3 | 134 | 160 | 2500 | 150 | 200 | 150 | 100 |
| 2 (Comparison) | 53.3 | 33.4 | 13.3 | 134 | 160 | 2500 | 150 | 200 | 150 | 100 |
| 3 (Comparison) | 53.9 | 32.2 | 13.8 | 134 | 160 | 2500 | 150 | 200 | 150 | 100 |
| 4 (Invention) | 53.6 | 33.1 | 13.3 | 134 | 160 | 2500 | 150 | 200 | 150 | 100 |
| 5 (Invention) | 54.3 | 32.4 | 13.3 | 134 | 160 | 2500 | 150 | 200 | 150 | 100 |
| 6 (Comparison) | 54.7 | 32.0 | 13.3 | 134 | 160 | 2500 | 150 | 200 | 150 | 100 |
| 7 (Comparison) | 53.9 | 33.4 | 12.7 | 134 | 160 | 2500 | 150 | 200 | 150 | 100 |
| 8 (Comparison) | 53.9 | 32.8 | 13.3 | 100 | 160 | 2500 | 150 | 200 | 150 | 100 |
| 9 (Comparison) | 53.9 | 32.8 | 13.3 | 180 | 160 | 2500 | 150 | 200 | 150 | 100 |
| 10 (Comparison) | 53.9 | 32.8 | 13.3 | 134 | 90 | 2500 | 150 | 200 | 150 | 100 |
| 11 (Comparison) | 53.9 | 32.8 | 13.3 | 134 | 280 | 2500 | 150 | 200 | 150 | 100 |
| 12 (Comparison) | 53.9 | 32.8 | 13.3 | 134 | 160 | 400 | 150 | 200 | 150 | 100 |
| 13 (Comparison) | 53.9 | 32.8 | 13.3 | 134 | 160 | 4200 | 150 | 200 | 150 | 100 |
| 14 (Comparison) | 53.9 | 32.8 | 13.3 | 134 | 160 | 2500 | 30 | 200 | 150 | 100 |
| 15 (Comparison) | 53.9 | 32.8 | 13.3 | 134 | 160 | 2500 | 400 | 200 | 150 | 100 |
| 16 (Comparison) | 53.9 | 32.8 | 13.3 | 134 | 160 | 2500 | 150 | 80 | 150 | 100 |
| 17 (Comparison) | 53.9 | 32.8 | 13.3 | 134 | 160 | 2500 | 150 | 450 | 150 | 100 |
| 18 (Comparison) | 53.9 | 32.8 | 13.3 | 134 | 160 | 2500 | 150 | 200 | 30 | 100 |
| 19 (Comparison) | 53.9 | 32.8 | 13.3 | 134 | 160 | 2500 | 150 | 200 | 250 | 100 |
| 20 (Comparison) | 53.9 | 32.8 | 13.3 | 134 | 160 | 2500 | 150 | 200 | 150 | 80 |
| 21 (Comparison) | 53.9 | 32.8 | 13.3 | 134 | 160 | 2500 | 150 | 200 | 150 | 230 |
| 22 (Invention) | 53.9 | 32.8 | 13.3 | 134 | 160 | 1500 | 250 | 150 | 150 | 100 |
| 23 (Invention) | 53.9 | 32.8 | 13.3 | 134 | 160 | 1000 | 200 | 150 | 150 | 100 |
| 24 (Comparison) | 53.5 | 29.5 | 17.0 | 130 | 170 | — | 200 | — | 150 | 100 |

Furthermore, the saturation magnetic flux density Bs at 25° C. and 100° C. was measured for each of the samples. The results are shown in Table 2.

Furthermore, the value of μi·Bs(25° C.)/Pcv(40° C.) was obtained for each of the samples. The values are shown in Table 2.

The effect of the invention is apparent from the results shown in Table 2. That is, in the samples (Nos. 1 to 5), in which the subsidiary components were constant within the scope of the invention, Samples Nos. 1, 4 and 5 having the ZnO amount within the scope of the invention exhibited a high saturation magnetic flux density Bs, whereas Samples Nos. 2 and 3 having the content outside the scope exhibited a low saturation magnetic flux density Bs.

Furthermore, the value of μC)/Pcv(40° C.) was obtained for each of the samples and shown in Table 2. In all the samples of the Example of the invention, the value of μi·Bs(25° C.)/Pcv(40° C.) was 7,000 or more.

In Samples Nos. 6 to 24, those having the contents of the subsidiary components within the scope of the invention exhibited a high initial permeability μi and a small core loss Pcv, whereas the samples having the content of at least one of the subsidiary components outside the scope of the invention and the sample having at least one of them substituted by another component exhibited that at least one of the initial permeability μi and the core loss Pcv was lowered. (As understood from Table 2, both of them were deteriorated in many of the samples of the Comparative Examples.)

Example 2

For an example, an air gap having a width of about 0.8 mm was provided in a pot-form core having the composition shown in Table 3 (Sample No. 2-1), and a coil was wound at 169 turns with an AL-value of 1,000 nH/N$^2$, so as to prepare a sample of a core for Example 2 (Sample No. 2-1). On the other hand, samples of cores for the Comparative Examples having the same structure as Sample No. 2-1 described above (Samples Nos. 2-2 and 2-3) were prepared with the compositions shown in Table 3.

For the core of the Example (Sample No. 2-1) and the cores of the Comparative Examples (Samples Nos. 2-2 and 2-3), the direct current overlapping characteristics [relationship between the inductance L (mH) and $I_{dc}$ (mA)] was measured on application of a magnetic field of an alternating current of 10 kHz. The results obtained are shown in FIG. 1. As understood from FIG. 1, in the relationship between the inductance L and $I_{dc}$, both the core of the Example and the cores of the Comparative Examples had a linear flat part of a constant value from the low current side, which was abruptly decreased at the certain current value. In the core of the Example (Sample No. 2-1), the current value that was improved as the direct current overlapping characteristics (current value at which the inductance was lowered by 10% from the linear flat part) was improved by 20% and 50% in comparison to the cores of the Comparative Examples (Samples Nos. 2-2 and 2-3), respectively.

Furthermore, for the core of the Example (Sample No. 2-1) and the cores of the Comparative Examples (Samples Nos. 2-2 and 2-3), an initial permeability μi at a frequency of 100 kHz and at 25° C., a core loss Pcv at a frequency of 100 kHz and at 200 mT and 40° C., and a saturation magnetic flux density Bs at a frequency of 100 kHz and at 25° C. were measured, and a μi·Bs/Pcv was calculated. The results are shown in Table 3.

The effect of the invention is apparent from the results of the Examples described above.

I claim:

1. A manganese-zinc system ferrite, which is a manganese-zinc system ferrite having an initial permeability μi at a frequency of 100 kHz and at 25° C. of 5,000 or more, and a core loss Pcv at a frequency of 100 kHz and at 200 mT and 40° C. of 400 kW/m$^3$ or less.

2. A manganese-zinc system ferrite as claimed in claim 1, which has a saturation magnetic flux density Bs at a frequency of 100 kHz and at 25° C. of 500 mT or more.

3. A manganese-zinc system ferrite as claimed in claim 1, wherein a main component raw material comprises an iron oxide raw material in an amount of from 53.6 to 54.4 mol % calculated as $Fe_2O_3$ and a zinc oxide raw material of from 13.0 to 13.5 mol % calculated as ZnO, with the balance being a manganese oxide raw material.

4. A manganese-zinc system ferrite as claimed in claim 3, wherein the amount of said iron oxide raw material is from 53.7 to 54.2 mol % calculated as $Fe_2O_3$.

TABLE 3

(a)

| Sample No. | Main Component (mol %) | | | Subsidiary Component (ppm) | | | | | | | |
|---|---|---|---|---|---|---|---|---|---|---|---|
| | $Fe_2O_3$ | MnO | ZnO | $SiO_2$ | CaO | $SnO_2$ | $Nb_2O_5$ | $ZrO_2$ | $Bi_2O_3$ | $MoO_3$ | $V_2O_5$ |
| 2-1 (Invention) | 54.0 | 32.7 | 13.3 | 130 | 150 | 2300 | 200 | 200 | 150 | 100 | — |
| 2-2 (Comparison) | 53.5 | 35.1 | 11.4 | 115 | 550 | — | 260 | — | — | — | 300 |
| 2-3 (Comparison) | 53.5 | 26.3 | 20.2 | 110 | 300 | — | 210 | — | — | 180 | — |

(b)

| Sample No. | Characteristics | | | |
|---|---|---|---|---|
| | μi | Bs (mT) | Pcv (kW/m$^3$) 40° C. | μi · Bs (25° C.)/Pcv (40° C.) |
| 2-1 (Invention) | 5900 | 520 | 320 | 9588 |
| 2-2 (Comparison) | 2300 | 500 | 470 | 2447 |
| 2-3 (Comparison) | 5500 | 430 | 510 | 4637 |

5. A manganese-zinc system ferrite as claimed in claim 1, wherein a subsidiary component raw material comprises a silicon oxide raw material in an amount of from 110 to 170 ppm calculated as $SiO_2$, a calcium oxide raw material in an amount of from 100 to 250 ppm calculated as CaO, a tin oxide raw material in an amount of from 500 to 4,000 ppm calculated as $SnO_2$, a niobium oxide raw material in an amount of from 50 to 350 ppm calculated as $Nb_2O_5$, a zirconium oxide raw material in an amount of from 100 to 400 ppm calculated as $ZrO_2$, a bismuth oxide raw material in an amount of from 50 to 200 ppm calculated as $Bi_2O_3$, and a molybdenum oxide raw material in an amount of from 50 to 200 ppm calculated as $MoO_3$.

6. A manganese-zinc system ferrite as claimed in claim 5, wherein a subsidiary component raw material comprises a silicon oxide raw material in an amount of from 115 to 150 ppm calculated as $SiO_2$, a calcium oxide raw material in an amount of from 130 to 230 ppm calculated as CaO, a tin oxide raw material in an amount of from 1,000 to 3,000 ppm calculated as $SnO_2$, a niobium oxide raw material in an amount of from 100 to 300 ppm calculated as $Nb_2O_5$, a zirconium oxide raw material in an amount of from 100 to 300 ppm calculated as $ZrO_2$, a bismuth oxide raw material in an amount of from 100 to 200 ppm calculated as $Bi_2O_3$, and a molybdenum oxide raw material in an amount of from 50 to 150 ppm calculated as $MoO_3$.

7. A manganese-zinc system ferrite, which is a manganese-zinc system ferrite having an initial permeability $\mu i$ at a frequency of 100 kHz and at 25° C., a core loss Pcv at a frequency of 100 kHz and at 200 mT and 40° C., and a saturation magnetic flux density Bs at 25° C. that satisfy:

$$7,000 \leq \mu i \cdot Bs/Pcv.$$

8. A manganese-zinc system ferrite as claimed in claim 7, wherein a main component raw material comprises an iron oxide raw material in an amount of from 53.6 to 54.4 mol % calculated as $Fe_2O_3$ and a zinc oxide raw material of from 13.0 to 13.5 mol % calculated as ZnO, with the balance being a manganese oxide raw material.

9. A manganese-zinc system ferrite as claimed in claim 7, wherein the amount of the iron oxide raw material is from 53.7 to 54.2 mol % calculated as $Fe_2O_3$.

10. A manganese-zinc system ferrite as claimed in claim 7, wherein a subsidiary component raw material comprises a silicon oxide raw material in an amount of from 110 to 170 ppm calculated as $SiO_2$, a calcium oxide raw material in an amount of from 100 to 250 ppm calculated as CaO, a tin oxide raw material in an amount of from 500 to 4,000 ppm calculated as $SnO_2$, a niobium oxide raw material in an amount of from 50 to 350 ppm calculated as $Nb_2O_5$, a zirconium oxide raw material in an amount of from 100 to 400 ppm calculated as $ZrO_2$, a bismuth oxide raw material in an amount of from 50 to 200 ppm calculated as $Bi_2O_3$, and a molybdenum oxide raw material in an amount of from 50 to 200 ppm calculated as $MoO_3$.

11. A manganese-zinc system ferrite as claimed in claim 7, wherein a subsidiary component raw material comprises a silicon oxide raw material in an amount of from 115 to 150 ppm calculated as $SiO_2$, a calcium oxide raw material in an amount of from 130 to 230 ppm calculated as CaO, a tin oxide raw material in an amount of from 1,000 to 3,000 ppm calculated as $SnO_2$, a niobium oxide raw material in an amount of from 100 to 300 ppm calculated as $Nb_2O_5$, a zirconium oxide raw material in an amount of from 100 to 300 ppm calculated as $ZrO_2$, a bismuth oxide raw material in an amount of from 100 to 200 ppm calculated as $Bi_2O_3$, and a molybdenum oxide raw material in an amount of from 50 to 150 ppm calculated as $MoO_3$.

* * * * *

UNITED STATES PATENT AND TRADEMARK OFFICE
CERTIFICATE OF CORRECTION

PATENT NO. : 5,980,773

DATED : November 9, 1999

INVENTOR(S): Osamu TAKEDA

It is certified that an error appears in the above-identified patent and that said Letters Patent is hereby corrected as shown below:

On the title page, item [30], the Foreign Application Priority Data is missing. It should read as follows:

On the title page:
--[30]     Foreign Application Priority Data

Aug. 29, 1997   [JP]   Japan ........................... 9-249737
    Dec. 9, 1997    [JP]   Japan ........................... 9-356079--

Signed and Sealed this

Twenty-second Day of May, 2001

Attest:

NICHOLAS P. GODICI

*Attesting Officer*   *Acting Director of the United States Patent and Trademark Office*